B. HAVILAND & G. P. GUNN,

Assignors, by mesne assignments, to H. M. QUACKENBUSH.

TOY PISTOL.

No. 10,210. Reissued Sept. 26, 1882.

WITNESSES.
H. F. Parker
C. M. Forbes

INVENTORS
Benj Haviland
Geo P Gunn

N. PETERS, Photo-Lithographer, Washington, D. C.

UNITED STATES PATENT OFFICE.

BENJAMIN HAVILAND AND GEORGE P. GUNN, OF HERKIMER, NEW YORK, ASSIGNORS, BY MESNE ASSIGNMENTS, TO HENRY M. QUACKENBUSH, OF SAME PLACE.

TOY PISTOL.

SPECIFICATION forming part of Reissued Letters Patent No. 10,210, dated September 26, 1882.

Original No. 126,954, dated May 21, 1872. Application for reissue filed December 14, 1880.

*To all whom it may concern:*

Be it known that we, BENJAMIN HAVILAND and GEORGE P. GUNN, of Herkimer, in the county of Herkimer and State of New York, have invented a new and useful Improvement in Toy Air-Pistols; and we do hereby declare that the following is a full, clear, and exact description of the same, reference being had to the accompanying drawings, forming a part of this specification, in which—

Figure 1:
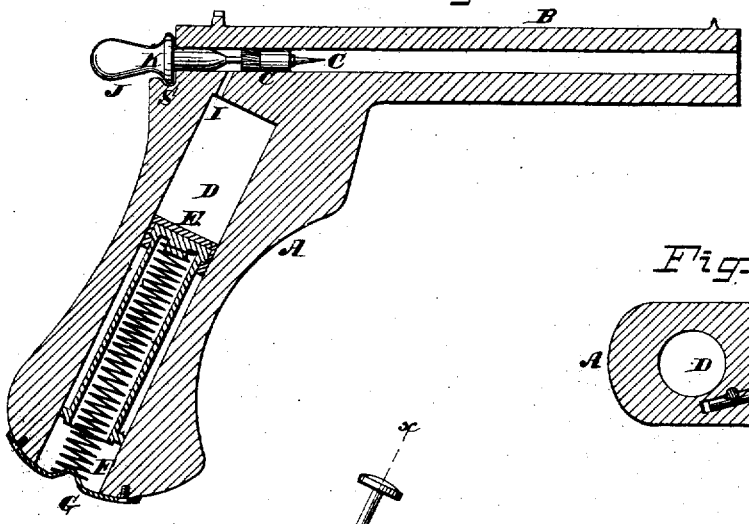
Figure 4:
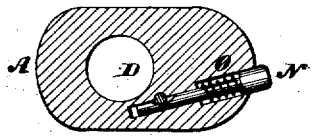
Figure 2:
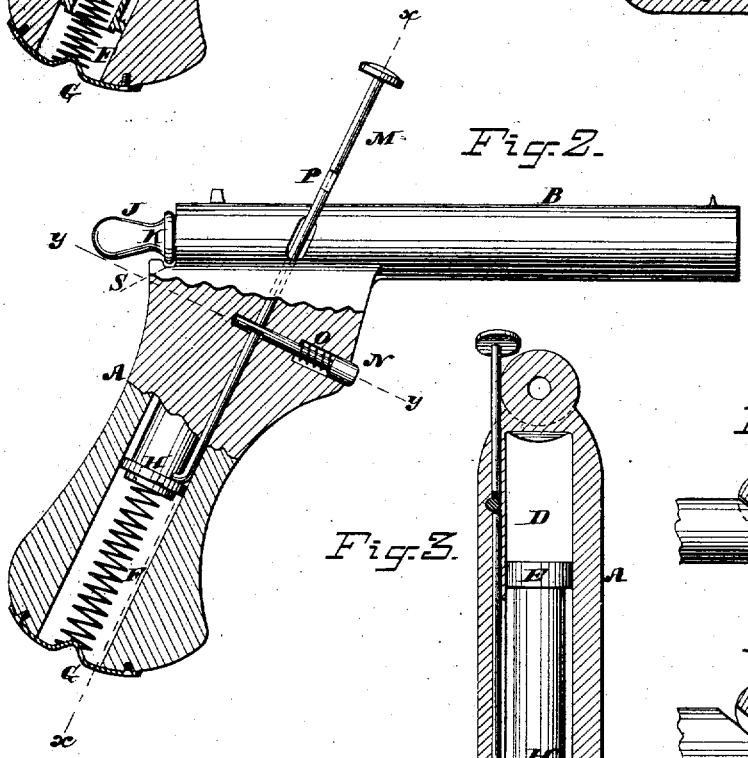
Figure 3:
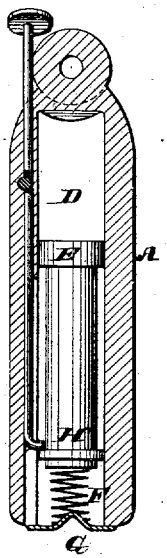

Figure 1 represents a longitudinal central section; Fig. 2, a side view, partly in section; Fig. 3, a transverse sectional view on the line *x x*, Fig. 2; Fig. 4, a cross-section on the line *y y* of Fig. 2, and Figs. 5 and 6 enlarged engaging portions of the compressing-rod and trigger.

Similar letters of reference indicate corresponding parts in the several figures.

This invention relates to that class of toy air-pistols in which a piston is employed within the air-chamber; and it consists in the construction and combination of parts substantially as hereinafter set forth and claimed.

In order that others may understand and apply our invention, we will proceed to describe a device embodying it.

In the drawings, A represents the stock of a pistol, B the barrel, and D the air-chamber, which contains the piston E and spring F. The air-chamber D and bore of the barrel are connected by a contracted passage, I. The bottom of the air-chamber is covered by an exterior cap, G, fastened to the end of the stock, and forms a rest for the spring F.

The piston E is composed of a hollow cylinder of sufficient length to incase the coiled spring when compressed, and is provided with a circumferential flange, H, fitting the air-chamber, and against which the inner end of the compressing-rod M engages, as shown in Figs. 2 and 3. The compressing-rod M is arranged in a line corresponding to the movement of the piston, and projects beyond the exterior of the barrel a distance equal to the travel of the piston, its projecting end being provided with a button, as shown in Fig. 2, to form a bearing and prevent injury to the hand or a fixed object when placed against it in the act of compressing the spring in setting the piston.

Figure 5:
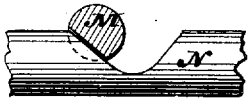
Figure 6:
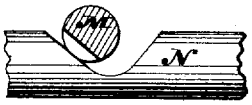

N is the trigger, having a notch (shown enlarged in Figs. 5 and 6) for engaging with a corresponding notch on the rod M when the piston is forced down, the spiral spring O retaining the notches in engagement and returning the trigger to its outward position when the parts are released, the relative positions of the respective notches in the rod M and trigger N when engaged and released being shown in the enlarged views, Figs. 5 and 6.

J represents the breech-pin, which is fitted to fill the rear end of the bore of the barrel, and constructed with an eccentric flange or collar, K, that engages, when the pin is partly turned, with a notch, S, in the stock, thereby securing it in place. The breech-pin J is made of sufficient length to push the projectile beyond or forward of the air-passage I, leading from the air-chamber.

The method of using this pistol is as follows: The stock of the pistol is grasped in the left hand and the compressing-rod pushed inward by pressing upon the button with the right hand; or the button may be placed against a wall, floor, or any stationary object and the rod pushed inwardly by bearing upon the stock, thereby compressing the spring and moving the piston to the bottom or rear end of the air-chamber. The notch on the rod M engages with the trigger and retains the parts in position for firing. The plug or pin J is removed and a projectile inserted, when the pin is replaced and turned partly around, so that the flange or collar K engages with the notch S in the stock. The pistol may now be discharged by pressing upon the trigger in the usual manner, which releases the rod M and piston. The spring acting upon the piston forces it suddenly forward, and thereby compresses the confined air in the chamber D, which finds its outlet through the passage J and expels the projectile through the barrel. This method of compresssing the spring enables us to employ one of much greater tension than when the organization of the devices for setting the piston require a pulling action, as the weight of a person bearing upon the stock can be utilized in placing the projecting end of the rod M against a fixed object, when the device can be easily operated by a woman or child.

Having thus fully described our invention, what we claim, and desire to secure by Letters Patent, is—

1. The combination of the piston E and cylinder D, the latter arranged in the stock of the pistol and at an angle with the axis of the barrel, substantially as shown and described.

2. In an air-pistol, the combination of a pistol-barrel, a cylinder, and an air-compressing piston and its spring with a charging-rod, which is attached to said pistol and extends in a line parallel to the line of motion of the piston to facilitate compression by pushing.

3. In combination with the air-compressing piston and its spring, a notched charging-rod connected to said piston and extending in a line parallel to the line of motion thereof, and a trigger arranged to engage with the notch of said rod.

4. An air-pistol having an air-compressing space or cylinder, D, which communicates with the breech end of the barrel, in combination with a breech-plug which is arranged to enter the open rear end of the barrel and to force the missile beyond the passage connecting said cylinder and barrel, and at the same time to close said barrel, so that the compressed air may drive said missile forward.

BENJ. HAVILAND.
GEO. P. GUNN.

Witnesses:
D. D. GIBSON,
E. H. DOOLITTLE.